US008157267B2

(12) United States Patent
Mast

(10) Patent No.: US 8,157,267 B2
(45) Date of Patent: Apr. 17, 2012

(54) FREE-FLOATING GAS SEAL

(75) Inventor: Thomas M. Mast, Carrollton, TX (US)

(73) Assignee: Textron Innovations Inc., Providence, RI (US)

( * ) Notice: Subject to any disclaimer, the term of this patent is extended or adjusted under 35 U.S.C. 154(b) by 453 days.

(21) Appl. No.: 11/662,829

(22) PCT Filed: Oct. 1, 2004

(86) PCT No.: PCT/US2004/032606
§ 371 (c)(1),
(2), (4) Date: Mar. 14, 2007

(87) PCT Pub. No.: WO2006/041463
PCT Pub. Date: Apr. 20, 2006

(65) Prior Publication Data
US 2007/0257442 A1 Nov. 8, 2007

(51) Int. Cl.
*F16J 15/34* (2006.01)
(52) U.S. Cl. ....................... 277/391; 277/370
(58) Field of Classification Search .................. 277/370,
277/371, 391, 392, 393; 415/135, 174.2, 415/174.3, 230, 231
See application file for complete search history.

(56) References Cited

U.S. PATENT DOCUMENTS

| | | | | | |
|---|---|---|---|---|---|
| 2,251,219 | A | * | 7/1941 | Brummer | 277/392 |
| 2,598,484 | A | * | 5/1952 | Adams | 417/423.11 |
| 3,063,142 | A | * | 11/1962 | Kroon | 29/424 |
| 3,512,790 | A | * | 5/1970 | Raymond | 277/375 |
| 3,975,028 | A | * | 8/1976 | Satsumabayashi et al. | 305/103 |
| 3,977,465 | A | * | 8/1976 | Tank | 165/9 |
| 4,163,563 | A | * | 8/1979 | Mullaney | 277/392 |
| 4,199,151 | A | | 4/1980 | Bartos | |
| 4,218,067 | A | * | 8/1980 | Halling | 277/605 |
| 4,744,569 | A | * | 5/1988 | Wentworth et al. | 277/379 |
| 5,022,663 | A | * | 6/1991 | Fages et al. | 277/644 |
| 5,340,121 | A | * | 8/1994 | Lewis et al. | 277/393 |
| 5,375,854 | A | * | 12/1994 | Carlisle et al. | 277/377 |
| 5,941,531 | A | * | 8/1999 | Parker et al. | 277/369 |
| 6,299,178 | B1 | * | 10/2001 | Halling | 277/654 |
| 6,626,440 | B2 | * | 9/2003 | Halling | 277/626 |
| 6,926,284 | B2 | * | 8/2005 | Hirst | 277/603 |
| 2004/0173975 | A1 | | 9/2004 | Hirst | |

OTHER PUBLICATIONS

CA Office Action, Sep. 10, 2009.
Office Action dated Feb. 10, 2010 from Chinese Patent Application No. 200480044138.6.
Chinese Office Action dated Aug. 26, 2010 from counterpart Chinese Patent Application No. 2004480044138.6.
Response dated Mar. 17, 2010 from Chinese Patent Application No. 200480044138.6.
Canadian Office Action dated May 21, 2010 from corresponding Canadian Patent Application No. 2,580,651.
Response to Canadian Office Action dated May 21, 2010 from corresponding Canadian Patent Application No. 2,580,651.

* cited by examiner

*Primary Examiner* — Gilbert Lee
(74) *Attorney, Agent, or Firm* — James E. Walton; Richard G. Eldredge

(57) ABSTRACT

A seal system is adapted for use in gas flow systems. The seal system has two seal faces and a longitudinally compressible seal spring-biased between the seal faces. The seal has a bellows configuration and opposite ends in sealing contact with the seal faces, such that at least one end of the seal is free to move relative to the corresponding seal face while maintaining the sealing contact. The seal system is particularly suited for use in sealing an engine to an exhaust member.

6 Claims, 5 Drawing Sheets

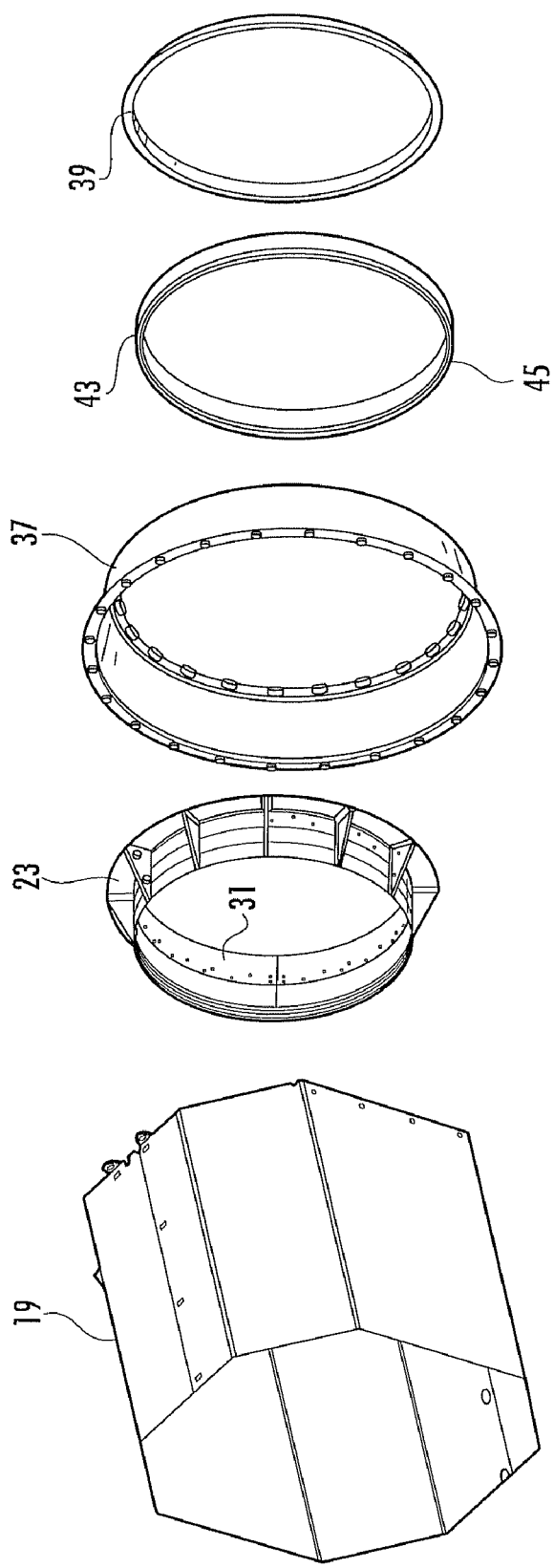

FREE-FLOATING GAS SEAL

TECHNICAL FIELD

The present invention relates to seals. In particular, the present invention relates to seals useful in controlling the flow of exhaust gas exiting from a jet engine.

DESCRIPTION OF THE PRIOR ART

Many types of aircraft use turbines to provide the power necessary for flight. One example would be a rotary wing aircraft with a turbine driving the rotating wing. In such aircraft the turbine engine is securely fastened to the airframe of the rotary aircraft and an exhaust system may be attached to the exhaust end of the engine to redirect exhaust gases as desired. So long as the exhaust system is relatively lightweight, the engine can support the extra load. Because the exhaust system is attached directly to the engine the seal between the exhaust system and the engine is relatively simple. The main concern at this joint is the support of the exhaust system.

Recent advancements in exhaust systems have led to heavier exhaust systems that reduce the heat signature of the aircraft as viewed through infrared equipment, among other advantages. Such exhaust systems make the aircraft more difficult to spot and follow with infrared equipment, which is very important in military applications.

Due to the added weight of the infrared suppressing exhaust system, the exhaust system is no longer light enough to attach to the engine for support. Instead, the exhaust system must be mounted directly to the airframe. Because the engine and the exhaust are mounted to different parts of the airframe, and because airframes flex during use, the exhaust and the engine are no longer relatively static. The exhaust system may move in three dimensions relative to the output end of the engine. Therefore, a rigid connection between the engine and the exhaust system would put stresses on the engine and the exhaust system.

Several problems arise when trying to mate the exhaust system to the engine and provide for both axial and radial movement in the joint. The problems stem from the relative motion that must be accommodated, the high temperatures of the environment, and the need for an adequate seal. A first problem is leakage from seals such as a finger seal, which do not adequately seal the exhaust gases. A second problem is the large diameter of the seal when trying to use a labyrinth joint or rope seal that provides for sufficient radial movement. A third problem is the weight of the seal if a complex arrangement is used to accommodate the movement, but still provide adequate sealing. A fourth problem is the maintenance of the seal; longer service periods are needed and a passive failure is desired.

Although there have been significant developments in the area of sealing exhaust systems to turbine engines, considerable shortcomings remain.

SUMMARY OF THE INVENTION

There is a need for an exhaust seal that provides a good seal in the demanding exhaust environment while also being light weight, low profile, durable, and that has a passive failure.

Therefore, it is an object of the present invention to provide an exhaust seal that provides a good seal in the demanding exhaust environment while also being light weight, low profile, durable, and that has a passive failure.

This object is achieved by providing a seal system adapted for use in gas flow systems. The seal system has two seal faces and a longitudinally compressible seal spring-biased between the seal faces. The seal has a bellows configuration and opposite ends in sealing contact with the seal faces, such that at least one end of the seal is free to move relative to the corresponding seal face while maintaining the sealing contact. The seal system is particularly suited for use in sealing an engine to an exhaust member.

The present invention provides significant advantages, including: (1) very good seal for a joint in a very high temperature environment with significant radial and axial movement; (2) relatively low weight; (3) relatively low physical profile; (4) longer useful service life; and (5) passive failure to ensure safety beyond the useful service life.

Additional objectives, features, and advantages will be apparent in the written description that follows.

BRIEF DESCRIPTION OF THE DRAWINGS

The novel features believed characteristic of the invention are set forth in the appended claims. However, the invention itself, as well as, a preferred mode of use, and further objectives and advantages thereof, will best be understood by reference to the following detailed description when read in conjunction with the accompanying drawings, wherein:

FIG. 5 is an axially exploded view of the components of the exhaust seal shown in FIG. 2.

DESCRIPTION OF THE PREFERRED EMBODIMENT

The present invention represents the discovery that a free-floating seal comprising a bellow and face seals can provide for low leakage rates between components in a gas flow system while allowing significant longitudinal and transverse movement of the components relative to each other. The seal is particularly suited for use in a high temperature environment, such as an exhaust seal between a turbine engine and a separately supported exhaust system that experience axial and radial movement relative to each other.

Figure 1:
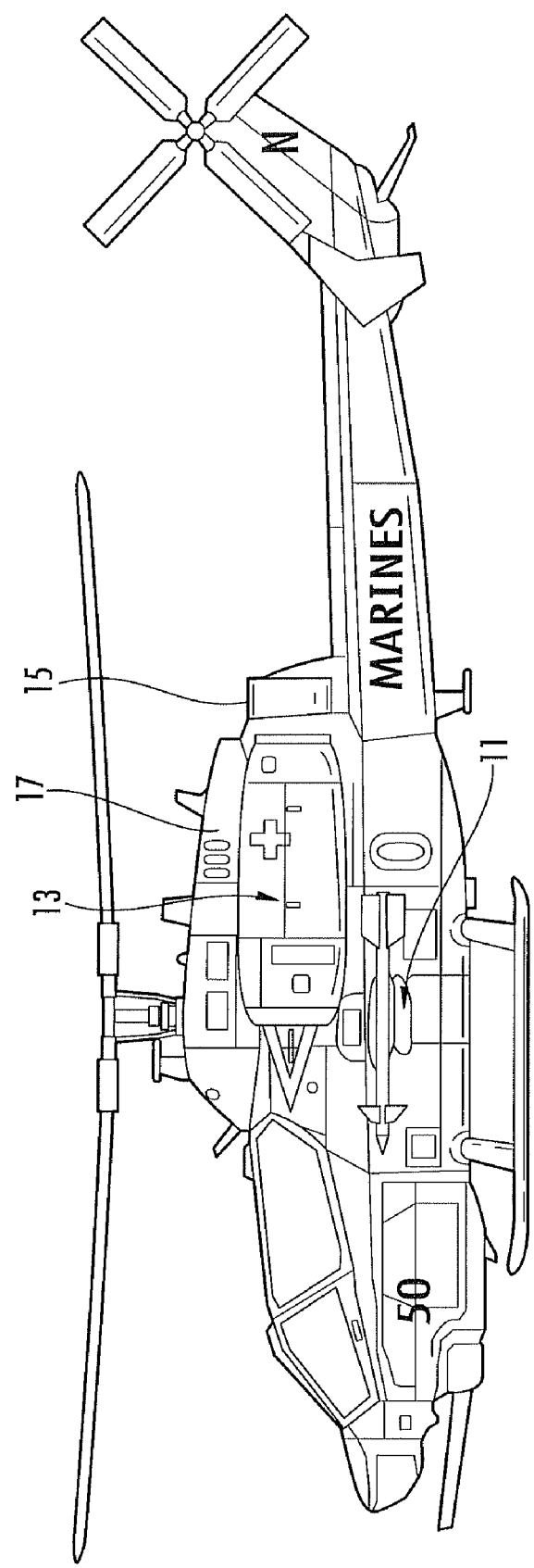
FIG. 1 is a turbine engine powered rotary wing aircraft with an infrared reducing exhaust system.

Referring to FIG. 1 in the drawings, a rotary wing aircraft 11 with a turbine engine 13 and exhaust system 15 is illustrated. Aircraft 11 has an airframe 17. Engine 13 and exhaust system 15 are each attached to airframe 17 at separate points for structural support. Aircraft 11 is not limited to rotary wing aircraft, as turbines are widely used on other types of aircraft, such as fixed-wing and tiltrotor aircraft. Additionally, the seal disclosed below may be used wherever exhaust system 15 and engine 13 may experience significant relative axial and radial movement.

Figure 2:
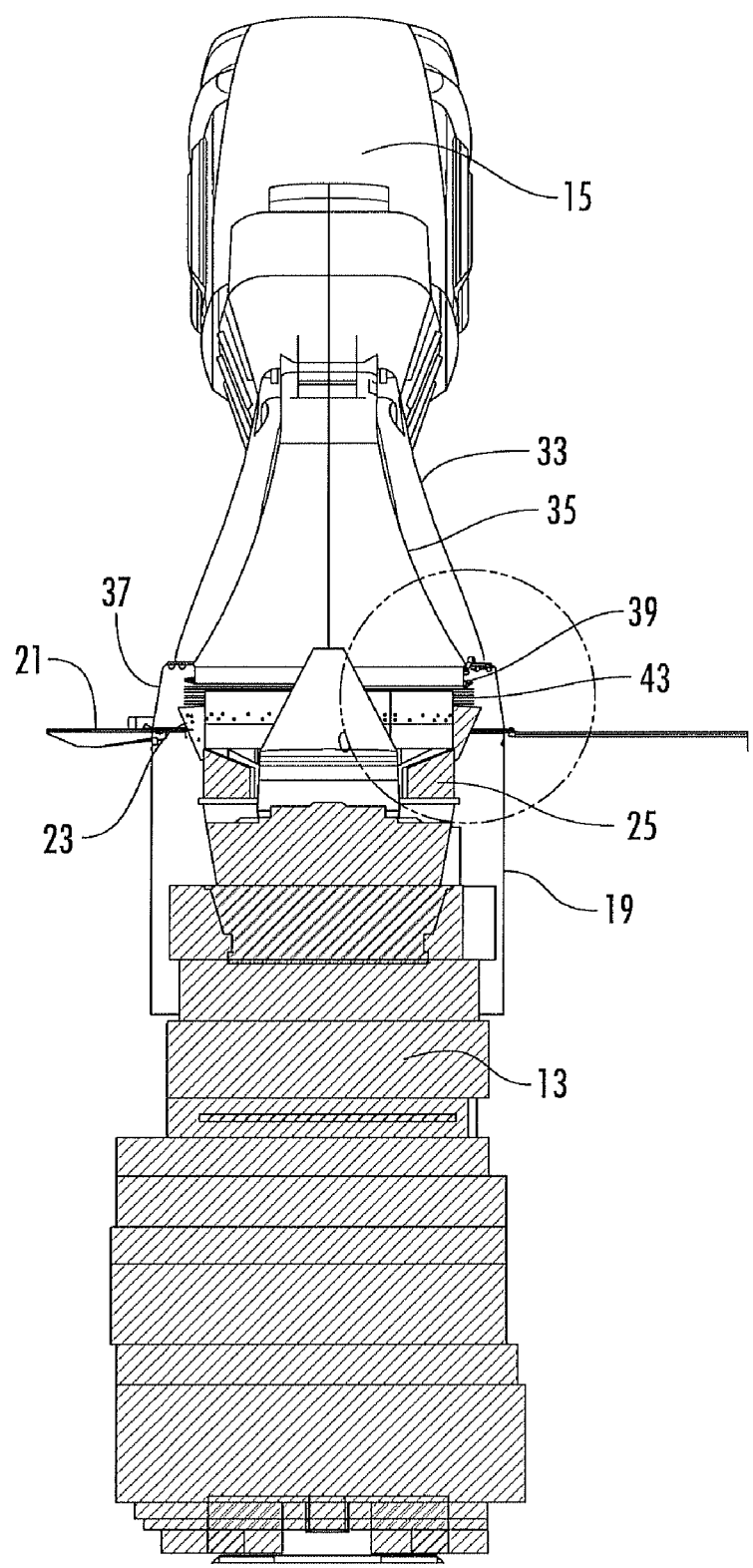
FIG. 2 is a cross-sectional view of the engine and exhaust system of the aircraft of FIG. 1.
Figure 3:
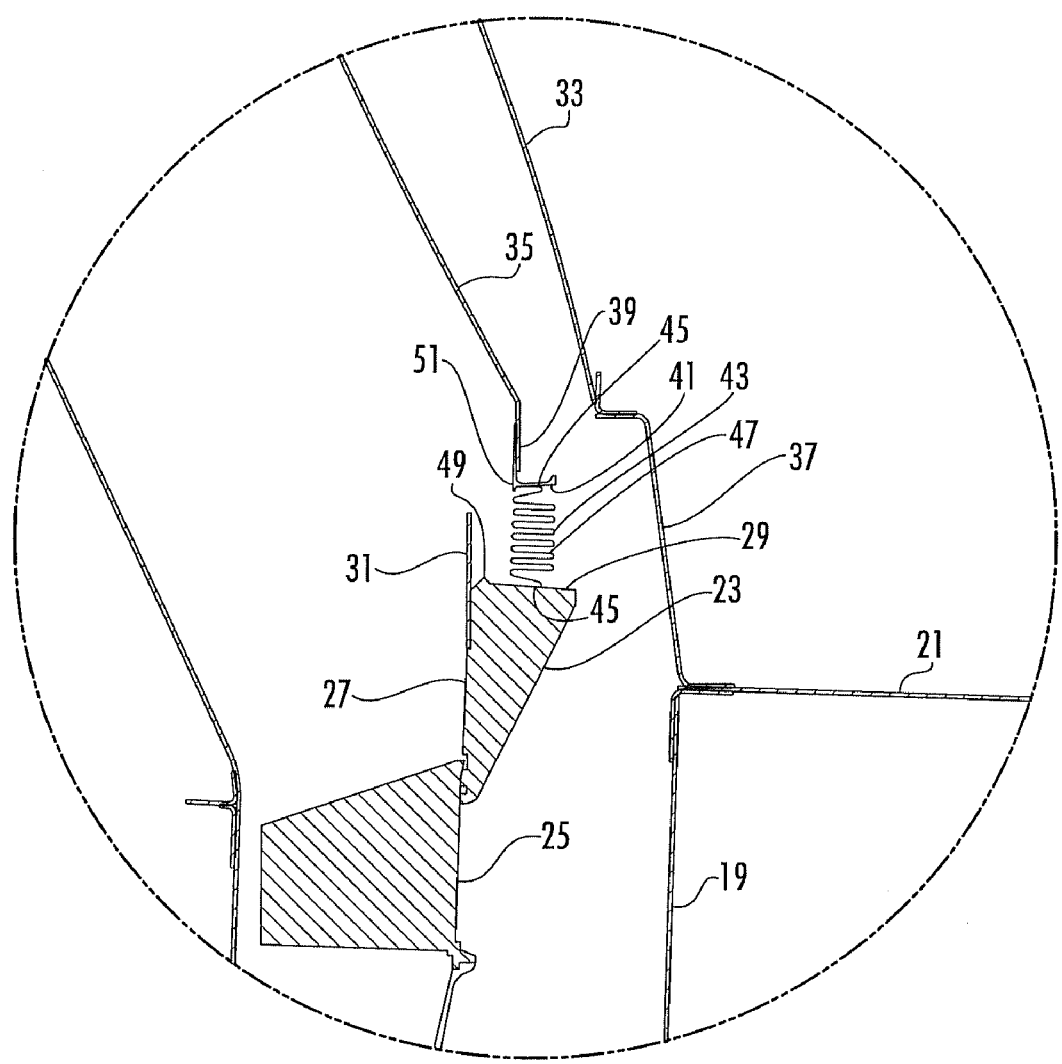
FIG. 3 is a sectional close up of the exhaust seal shown in FIG. 2.

Referring now FIGS. 2 and 3 in the drawings, a preferred embodiment of the invention is shown. Engine 13 is shown attached to exhaust system 15 in a sectional view. Engine 13 has an outer heat shield 19 which is attached to aft firewall 21. Within heat shield 19 the engine terminates with a deswirl duct 25. A circumferential member, such as split ring 23, is attached to deswirl duct 25. As shown in FIG. 3, split ring 23 has an inner circumference 27 and a preferably circumferential axial face 29. An optional flow-directing means may be located near split ring 23. For example, liner 31 is a cylindrical sleeve that extends axially along the inner circumference 27 toward exhaust system 15.

Continuing with FIG. 2 in the drawings, exhaust system 15 has an outer liner 33 and an inner liner 35. An adapter can 37 attaches to heat shield 19 and abuts outer liner 33. An aft seal ring 39 is attached to inner liner 35. Aft seal ring 39 has a preferably circumferential axial face 41.

Referring now to FIG. 3, a corrugated bellows 43 is positioned between axial face 41 of aft seal ring 39 and axial face 29 of split ring 23. Bellows 43 is preferably a free-floating, circumferential unit, though one end of bellows 43 may be fixedly attached relative to engine 13 or to exhaust system 15. A lip 45 is formed on each axial ends of bellows 43, with lips 45 being formed to be parallel to axial faces 29, 39. Bellows 43 is compressed slightly between axial faces 29, 41 to provide axial pressure between each lip 45 and the corresponding axial face 29, 41. Lips 45 and axial faces 29, 41 cooperate to form face seals for preventing the escape of exhaust gases at the junction of engine 13 and exhaust system 15.

Continuing with FIG. 3, a close-up sectional view of bellows 43 shows how it relates to the nearby parts. Bellows 43 has corrugations 47 between lips 45 that may be compressed axially and allow for some radial movement of lips 45 relative to each other. Axial face 29 has a radial thickness that allows for radial movement of corresponding lip 45. A stop means, such as stop 49, is located on an inner portion of face 29 to limit the radial movement of lip 45. Additionally, axial face 41 has a radial thickness that allows for radial movement of corresponding lip 45 and a corresponding stop 51 to limit radial movement of corresponding lip 45. Because all radial movement is relative between axial face 29 and axial face 41, the radial thickness may be split evenly between axial faces 29, 41 or one of the axial faces 29, 41 may have more radial thickness than the other. As shown, axial face 29 has a slightly more radial thickness than axial face 41.

Also apparent from FIG. 3 is the function of liner 31 in directing exhaust gases past bellows 43. As the exhaust gases flow from engine 13 to exhaust system 15, the flow travels along the inner face of liner 31, which extends for at least a portion of the length of bellows 43, preventing the flow from directly impinging on bellows 43. This reduces the pressure on bellows 43 and thereby reduces the overall leakage rate around bellows 43. Although shown in the drawings as a cylindrical liner 31, various types of flow-directing means may be substituted for liner 31 to limit the amount of flow pressure on bellows 43.

One important aspect of bellows 43, as shown, is that if lips 45 wear completely away, corrugations 47 will contact axial faces 29, 41 and provide some degree of sealing. This is known as a passive failure because the sealing effectiveness is reduced gradually, instead of an instantaneous complete failure of the seal.

Figure 4:
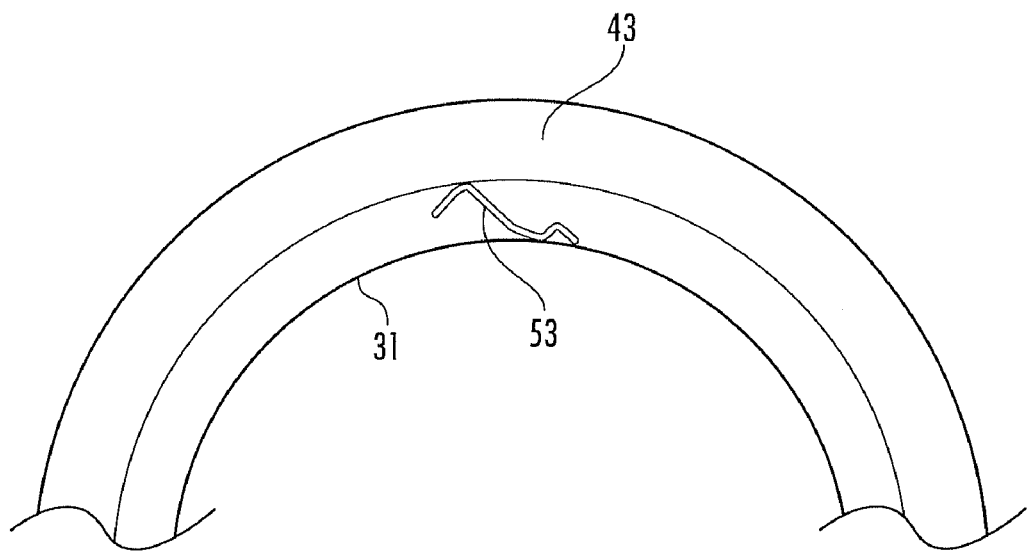
FIG. 4 is an axial view of the exhaust seal shown in FIG. 2.

Referring now to FIG. 4 in the drawings, an axial view of bellows 43 and split ring 23 shows the use of centering bumpers 53 attached to liner 31. While stops 49, 51 limit the radial movement of lips 45, centering bumpers 53 are positioned to limit the radial movement of corrugations 47 between lips 45. Bumpers 53 urge bellows 43 toward the center of the limits of travel and are particularly useful to prevent sagging of bellows 43 when engine 13 is positioned horizontally.

Referring now to FIG. 5 in the drawings, a partially exploded view of the parts surrounding bellows 43 shows how the parts fit together. As shown, split ring 23 may be formed of multiple parts bolted together to allow ease of assembly and disassembly for maintenance purposes. Additionally, liner 31 may be bolted to inner circumference 27 of split ring 23 for ease of replacement. Adapter can 37 is shown as clearly larger in diameter than split ring 23, bellows 43 and aft seal ring 39, thus creating a space as shown in FIG. 3.

Because of the heat generated by engine 13 a heat resistant material is preferred when constructing bellows 43. One example is INCONEL®, which may be rolled from a sheet into a cylinder which may then be corrugated. Finally, lips 45 may be formed. INCONEL® is well known for having high temperature resistance and high strength. Other similar materials may be used in this application. Additionally, a coating, such as chromium carbide, on the adjacent surfaces lips 45 and axial faces 29, 41, may improve both the sealing characteristics and the wear characteristics of the system.

It is apparent that an invention with significant advantages has been described and illustrated. Although the present invention is shown in a limited number of forms, it is not limited to just these forms, but is amenable to various changes and modifications without departing from the spirit thereof.

I claim:

1. A seal system for sealing an engine to an exhaust member, the seal system comprising:
   a stationary ring member operably associated with the engine, the ring having:
      a first seal face; and
      an inner circumferential surface configured to channel a flow of engine exhaust;
   an aft seal ring having:
      a liner in gaseous communication with the stationary ring, the liner being configured to redirect flow direction of the flow of engine exhaust, the liner having:
         a second seal face, the second seal face being spaced from and opposing the first seal face, the second seal face being configured to move in the longitudinal, transverse, and tilting directions relative to the first seal face in response to a force exerted against the liner by the flow of engine exhaust;
   a spring-biased bellows disposed between the first and second seal faces, the bellows being longitudinally compressible and having opposing ends in sealing contact with each corresponding seal face;
   a flow-directing means attached to the stationary ring member and configured to extend in a direction relatively parallel the inner surface of the stationary ring member for directing the flow of engine exhaust away from the bellow;
   a first stop located on the first seal face; and
   a second stop located on the second seal face;
   wherein the first stop and the second stop prevent transverse movement of the bellow relative to the respective first seal face and the second seal face; and
   wherein each end of the bellows slidingly engages the corresponding seal face so as to allow longitudinal and transverse movement of the seal faces relative to each other.

2. The seal system according to claim 1, wherein the at least one end of the seal is formed as a face seal for sealing against the corresponding seal face.

3. The seal system according to claim 1, wherein the bellows is at least partially formed from a metallic material.

4. The seal system according to claim 1, wherein at least one of the two seal faces is at least partially coated with a wear resistant and heat resistant coating.

5. The seal system according to claim 1, wherein at least one of the two seal faces is at least partially coated with a heat resistant material coating.

6. The seal system according to claim 1, wherein at least one of the two seal faces is at least partially coated with a chromium carbide coating.

* * * * *